Sept. 23, 1958　　　　J. H. BREMS　　　　2,852,960
TWIN CAM INDEXING DRIVE

Filed Jan. 2, 1957　　　　　　　　　　　3 Sheets-Sheet 1

INVENTOR.
JOHN H. BREMS
BY
Barnes, Kisselle, Laughlin & Raisch
ATTORNEYS

Sept. 23, 1958 J. H. BREMS 2,852,960
TWIN CAM INDEXING DRIVE
Filed Jan. 2, 1957 3 Sheets—Sheet 3

INVENTOR.
JOHN H. BREMS
BY
Barnes, Kisselle, Laughlin & Raisch
ATTORNEYS

2,852,960

TWIN CAM INDEXING DRIVE

John H. Brems, Detroit, Mich., assignor to Expert Die & Tool Company, Inc., Detroit, Mich., a corporation of Michigan Application January 2, 1957, Serial No. 632,195

18 Claims. (Cl. 74—821)

This invention relates to material handling devices and more particularly to an intermittent drive mechanism. It relates more especially to the step by step driving of such devices as conveyors, indexing tables and sequences of separate pieces seriatim.

It is an object of the present invention to provide an improved indexing type of intermittent driving head which is capable of standardized utilization in a variety of machine applications where it is desired to handle material in intermittent motion steps between accurately indexed positions.

A further object is to provide a drive of this type utilizing rotary driving cams in which the functions of deceleration, holding and acceleration are performed separately from the function of steady velocity driving.

A further object is to provide a drive of this type which is simple and reliable in construction and flexible in its application to a variety of types, sizes and index distances encountered in different applications.

Further objects and advantages of the present invention will be apparent from the following description, reference being had to the accompanying drawing wherein a preferred form of the present invention is clearly shown.

Figures 1, 2:
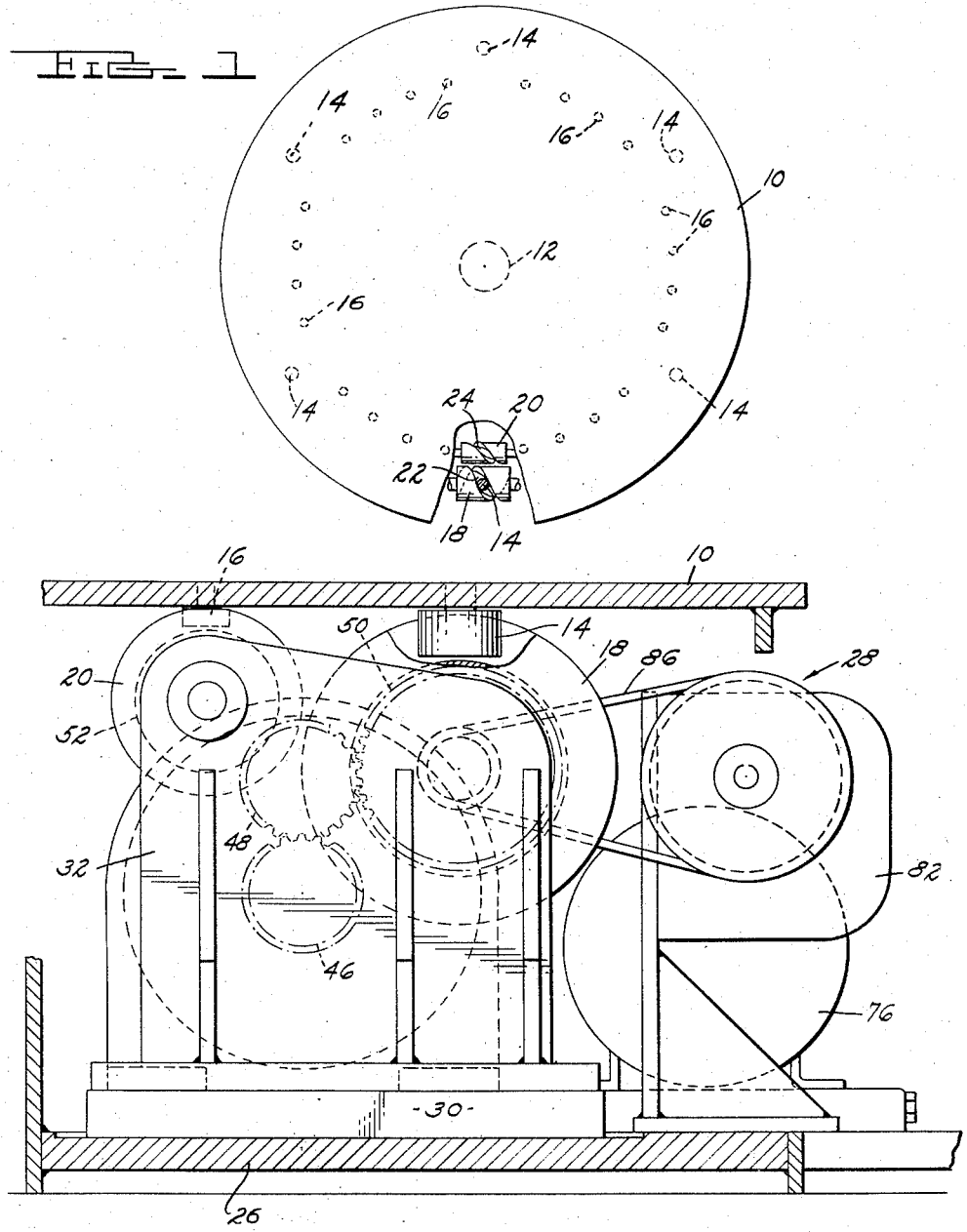
Fig. 1 is a top view, partially broken away, of a rotary table, illustrating a preferred embodiment of the present invention.
Fig. 2 is an end view of the driving unit with the table shown in section.

Referring now to Fig. 1, there is illustrated a conveyor which is represented by a rotary table 10 having a pivot at 12 for rotation of the table. When used in this specification, the term "conveyor" is intended to include all types of article carriers which partake of repetitive motion, such as the rotary table 10, rectilinear slides, chains or belts, as well as groups of separate articles or parts which are coupled in trains or stacked in abutment.

The lower surface of the table 10 carries a plurality of cam followers 14 which in this case are arranged in a circular path and equi-distantly spaced. Arranged in a second and somewhat smaller circular path is a series of secondary cam followers 16 which are located intermediate to the followers 14 and also equi-distantly spaced, except for the space radially opposite each of the followers 14.

The followers 14 and 16 are illustrated as depending pins rigidly secured to the table and carrying rotatable rollers journalled thereon by anti-friction bearings. It will be understood that the two series of cam followers may take other forms appropriate to the type of cam which they are to follow. Likewise they may be provided on the surface of other types of conveyor or may take the form of projections or depressions which are integral with the articles themselves which are being driven.

Positioned beneath the table 10 are a pair of drive cams of which 18 is designated the primary cam and 20 is designated the secondary cam. The primary cam 18 has a groove 22 cooperating with the first series of cam followers 14 and the cam 20 has a groove 24 cooperating with the second series of cam followers 16. The table 10 may be mounted by means of the pivot 12 upon a machine base indicated in Fig. 2 at 26, the representation in the embodiment chosen for illustration being intended as typical of multi-station, rotary-indexing machine tools.

Mounted on the base 26 is an indexing drive unit generally designated as 28. The unit 28 has its own base 30 upon which is provided a pair of upstanding brackets 32 and 34. Journalled in the brackets on anti-friction bearings 36 are a pair of cam trunnions 38 and 40 to which the cams 18 and 20 are non-rotatably fastened. Also journalled in the bracket 34 by means of an extension 42 is an input shaft 44 carrying a pinion 46. An idler pinion 48 also journalled upon the bracket 34 meshes with gears 46, 50 and 52, the latter two being secured to the cams 18 and 20 respectively.

Secured to the base 30 is a reduction gear unit 54, the output shaft 56 of which is coupled to the stub shaft 44 by a coupling 58. The input shaft 60 of the reduction gear 54 carries the driven rotor 62 of a combined clutch and brake unit 64 which is preferably of the electromagnetic type. The anchor section 66 of the brake unit is secured to the housing of the gear reducer 54, while the input section 68 of the clutch unit is journalled upon the driven member 62 by anti-friction bearings 70. The input section 68 includes a pulley 72 and a rotary collector ring 74 through which electrical connections to the clutch and brake unit are established.

Also mounted on the base 30 is an electric driving motor 76, having a pulley 78 connected by belts 80 with the pulley 72. A rotary cam type switch 82 is mounted on the base 30 and has an input shaft 84 coupled by means of a chain or timing belt drive 86 with the shaft 38 of the cam 18.

Figure 4:
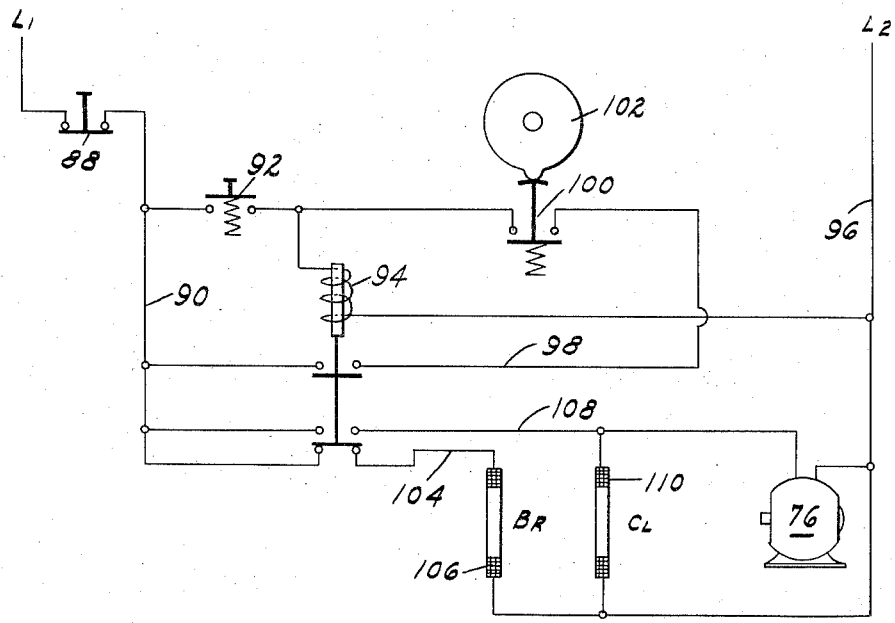
Fig. 4 is a diagram of an electric circuit used in the driving unit.

Referring to Fig. 4, the electric circuit of the drive unit includes a main line contactor 88 connecting the line input terminal L1 with the hot side conductor 90. A cycle initiating contactor 92 of the normally-open type connects between conductor 90 and the coil of a holding relay 94, the other side of which is connected to the ground side conductor 96. The contactor 92 may be either manually operated or may be automatically operated in coordination with selected stages in the cyclic operation of any associated mechanism.

The holding circuit 98 of the relay 94 includes a normally closed contactor 100, which is actuated by a cam 102 to be opened at the completion of each operating cycle of the complete drive unit 28. The contactor 100 and cam 102 are inside the rotary switch 82. The relay 94 controls a normally closed brake circuit 104, which includes the brake coil 106 forming part of the combined clutch and brake unit 64. The relay 94 also controls a normally open clutch and motor circuit 108 in which is included both the clutch coil 110 forming part of the unit 64, as well as the motor 76.

Figure 3:
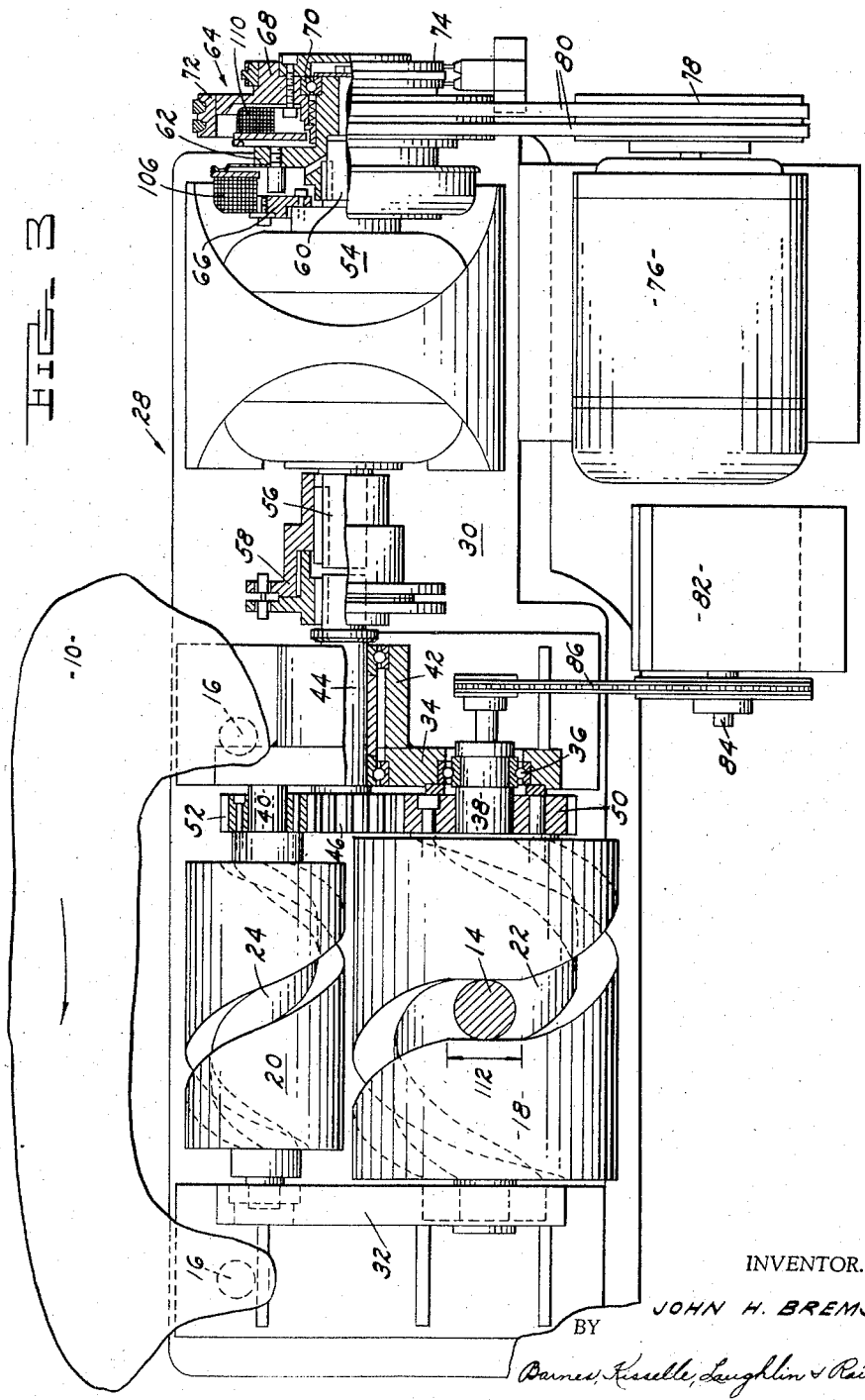
Fig. 3 is a top view of the driving unit with the table partly broken away.

In operation with the parts in the position shown in Figs. 1 and 3, one of the first series of cam followers 14 is in engagement with cam 18. The groove 22 is provided with a dwell section 112 at its mid-portion. On either side of the dwell section 112 the groove 22 has a progressively increasing helical pitch as the groove progresses towards each end of the cam. In the stationary position of the parts shown none of the second series of cam followers 16 is in engagement with the groove 24 of the secondary cam 20. This groove 24 is one of constant effective helical pitch. That is to say, it is a true helix modified to allow for the curved path of the followers 16 in the form shown in the drawing.

The conditions of the electric circuit with the parts in stopped position is illustrated in Fig. 4. With the main line contactor 88 closed, then if the cycle initiating contactor 92 be closed for a short interval, the brake coil 106 will be de-energized and the clutch and motor circuit 108 will be energized to start the motor 76 and to couple the input shaft 60 of the reduction gear 54 to the motor drive. Thus the cams 18 and 20 will be driven in synchronized rotation.

During the first part of the rotation of cam 18, the follower 14 will remain stationary because of the dwell portion 112 of the groove 22. This enables the motor 76 and the entire gear train to come up to operating speed under only a light load before starting to move the table 10. The curvature of the remaining sections of groove 22 may be designed to impart any desired acceleration and deceleration characteristics to the table motion.

After a predetermined small amount of rotation of the cam 18, the cam 102 in the switch 82 permits the holding contact 100 to close. Thereafter the initiating contactor 92 may be opened and the relay 94 will hold itself closed through the holding circuit 98 until such time as the cam 102 has made a full revolution to again open the holding contactor 100.

As the rotation of cams 18 and 20 continues, the follower 14 travels along the groove 22 and the table 10 is progressively accelerated. As the follower 14 nears the end of the groove 22 one of the followers 16 enters the groove 24 of the cam 20. Thereafter the secondary cam 20 takes over the drive of the table 10. It will be understood that the final velocity which the table reaches under the impetus of primary cam 18 is the same as the velocity which is thereafter imparted to it by the secondary cam 20.

The secondary cam continues to drive the table through each of the second set of cam followers 16 which lie intermediate to the first follower 14 and the next one coming up. It will be understood that the number of cam followers 16 which is utilized may be chosen with complete freedom from one to any desired number, depending on the requirements of each application.

When the last one of the followers 16 is about to leave the end of the groove 24 the next follower 14 has entered the groove 22 and the primary cam 18 thereafter takes over the drive of the table. During the progress of the pin 14 along the groove 22 to the dwell portion 112, the table is decelerated along any desired curve which may be built into the groove 22.

At about the time follower 14 enters the dwell portion 112 the cam 102 opens the holding contactor 100, thus de-energizing the relay 94. This de-energizes motor 76 and the clutch coil 110 and energizes the brake coil 106. The input shaft to the reduction gear 54 is thereby brought to a quick stop along with the remainder of the gear train and the cams 18 and 20.

It will be seen that the provision of the dwell portion 112 provides the advantage of minimizing the inertia which must be overcome in starting a cycle. It also provides a range of tolerance in the stopping time of the gear train without any increase in the tolerance for the stopping position of the table 10. Thus, by properly choosing the length of the dwell 112 in relation to (a) the acceleration time of the motor 76 and the gear train and cams; and (b) the normally encountered range of variation in the stopping distance of the gear train and cams, it is assured that the table will be brought to rest in a fixed position regardless of variations in friction and inertia.

It will be noted that the present invention provides a drive unit which is easily adapted to the driving of a variety of conveyor type mechanisms whether the motion be rotary or rectilinear. It will be understood that the particular type of cam and cam follower may be chosen from any of the well-known types of cam mechanism as may be required or advantageous for the particular type of conveyor mechanisms with which the drive unit is to be used.

While the form of embodiment of the invention as herein disclosed constitutes a preferred form, it is to be understood that other forms might be adopted, all coming within the scope of the claims which follow.

I claim:

1. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams concurrently from the motor to drive the conveyor, first from the primary cam alone as the conveyor leaves an indexed position, then from the secondary cam alone and finally from the primary cam alone as the conveyor approaches the next indexed position.

2. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams concurrently from the motor to drive the conveyor, first from the primary cam alone as the conveyor leaves an indexed position, then from the secondary cam alone and finally from the primary cam alone as the conveyor approaches the next indexed position, the primary cam having an accelerating section, a dwell section and a decelerating section, and the secondary cam consisting of only a constant velocity section.

3. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor of the drum type with a generally helical camming surface, a primary cam engageable intermittently with the first series of followers, a secondary cam engageable intermittently with the second series of followers, and means for driving the cams concurrently from the motor to drive the conveyor, first from the primary cam alone as the conveyor leaves an indexed position, then from the secondary cam alone and finally from the primary cam alone as the conveyor approaches the next indexed position.

4. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam of the drum type with a generally helical camming surface engageable intermittently with the second series of followers, and means for driving the cams concurrently from the motor to drive the conveyor, first from the primary cam alone as the conveyor leaves an indexed position, then from the secondary cam alone and finally from the primary cam alone as the conveyor approaches the next indexed position.

5. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising rotary cams of the drum type with a generally helical camming surface said cams comprising, a primary cam engageable intermittently with the first series of followers, a secondary cam of the drum type with a generally helical camming surface engageable intermittently with the second series of followers, and means for driving the cams concurrently to drive the conveyor, first from the primary cam alone as the conveyor leaves an indexed position, then from the secondary cam alone and finally from the primary cam alone as the conveyor approaches the next indexed position.

6. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising rotary cams of the drum type with a generally helical camming surface said cams comprising, a primary cam engageable intermittently with the first series of followers, a secondary cam of the drum type with a generally helical camming surface engageable intermittently with the second series of followers, and means for driving the cams concurrently to drive the conveyor, first from the primary cam alone as the conveyor leaves an indexed position, then from the secondary cam alone and finally from the primary cam alone as the conveyor approaches the next indexed position, the primary cam having an accelerating section, a dwell section and a decelerating section, and the secondary cam consisting of only a constant velocity section.

7. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a rotary cam switch driven with the cams and an electric circuit controlled thereby to initiate and to interrupt rotation of the cams concurrently from the motor to drive the conveyor, first from the primary cam alone as the conveyor leaves an indexed position, then from the secondary cam alone and finally from the primary cam alone as the conveyor approaches the next indexed position.

8. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a rotary cam switch driven with the cams and an electric circuit controlled thereby to initiate and to interrupt rotation of the cams concurrently from the motor to drive the conveyor, first from the primary cam alone as the conveyor leaves an indexed position, then from the secondary cam alone and finally from the primary cam alone as the conveyor approaches the next indexed position, the primary cam having a dwell section at its mid-portion effective to eliminate variations in stopping positions due to normally-encountered variations in friction and inertia.

9. An index head adapted to drive a conveyor intermittently between a plurality of stationary indexed positions, said conveyor having a first series of projecting cam followers arranged in a circular path, one for each indexed position and a second series of projecting cam followers spaced in positions intermediate to the indexed positions and traversing a circular path which is spaced from the path traversed by the first series of cam followers, said head comprising a rotary motor, a primary cam engageable intermittently with the first series of followers, a secondary cam engageable intermittently with the second series of followers, and means for driving the cams concurrently from the motor to drive the conveyor, first from the primary cam alone as the conveyor leaves an indexed position, then from the secondary cam alone and finally from the primary cam alone as the conveyor approaches the next indexed position.

10. An index head adapted to drive a conveyor intermittently between a plurality of stationary indexed positions, said conveyor having a first series of projecting cam followers arranged in a circular path, one for each indexed position and a second series of projecting cam followers spaced in positions intermediate to the indexed positions and traversing a circular path which is spaced from the path traversed by the first series of cam followers, said head comprising a rotary motor, a primary cam engageable intermittently with the first series of followers, a secondary cam engageable intermittently with the second series of followers, and means for driving the cams, including a rotary cam switch driven with the cams and an electric circuit controlled thereby to initiate and to interrupt rotation of the cams concurrently from the motor to drive the conveyor, first from the primary cam alone as the conveyor leaves an indexed position, then from the secondary cam alone and finally from the primary cam alone as the conveyor approaches the next indexed position.

11. An index head adapted to drive a conveyor intermittently between a plurality of stationary indexed positions, said conveyor having a first series of projecting cam followers arranged in a circular path, one for each indexed position and a second series of projecting cam followers spaced in positions intermediate to the indexed positions and traversing a circular path which is spaced from the path traversed by the first series of cam followers, said head comprising a rotary motor, a primary cam engageable intermittently with the first series of followers, a secondary cam engageable intermittently with the second series of followers and means for driving the cams, including a rotary cam switch driven with the cams and an electric circuit controlled thereby to initiate one to interrupt rotation of the cams concurrently from the motor to drive the conveyor, first from the primary cam alone as the conveyor leaves an indexed position, then from the secondary cam alone and finally from the primary cam alone as the conveyor approaches the next indexed position, the primary cam having a dwell section at its mid-portion effective to eliminate variations in stopping positions due to normally-encountered variations in friction and inertia.

12. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a clutch and a brake for selectively connecting the motor to rotate the cams and means driven in synchronism with the primary cam for controlling the clutch and a brake to drive both cams concurrently from the motor to drive the conveyor, first from the primary cam alone as the conveyor leaves an indexed position, then from the secondary cam alone and finally from the primary cam alone as the conveyor approaches the next indexed position.

13. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a clutch and a brake for selectively connecting the motor to rotate the cams and means driven in synchronism with the primary cam for controlling the clutch and the brake to drive both cams concurrently from the motor to drive the conveyor, first from the primary cam alone as the conveyor leaves an indexed position, then from the secondary cam alone and finally from the primary cam alone as the conveyor approaches the next indexed position, the primary cam having a dwell section at its mid-portion effective to eliminate variations in stopping positions due to normally-encountered variations in friction and inertia.

14. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a clutch and a brake for selectively connecting the motor to rotate the cams and means driven in synchronism with the primary cam for controlling the clutch and the brake to drive both cams concurrently from the motor to drive the conveyor, first from the primary cam alone as the conveyor leaves an indexed position, then from the secondary cam alone and finally from the primary cam alone as the conveyor approaches the next indexed position.

15. An index head adapted to drive a conveyor intermittently between a plurality of stationary indexed positions, said conveyor having a first series of projecting cam followers, one for each indexed position and a second series of projecting cam followers spaced in positions intermediate to the indexed positions and traversing a path which is spaced from the path traversed by the first series of cam followers, said head comprising a rotary motor, a primary cam engageable intermittently with the first series of followers, a secondary cam engageable intermittently with the second series of followers, and means for driving the cams, including a clutch and a brake for selectively connecting the motor to rotate the cams and means driven in synchronism with the primary cam for controlling the clutch and the brake to drive both cams concurrently from the motor to drive the conveyor, first from the primary cam alone as the conveyor leaves an indexed position, then from the secondary cam alone and finally from the primary cam alone as the conveyor approaches the next indexed position, the primary cam having a dwell section at its mid-portion effective to eliminate variations in stopping positions due to normally-encountered variations in friction and inertia.

16. An intermittent driving head for conveyors and the like comprising a pair of cylindrical cams each having a generally helical camming surface and having their axes parallel, gearing connecting the cams for synchronized rotation, and a motor for driving the cams, one cam having a substantially helical camming surface of constant effective pitch and the other cam having a camming surface of variable pitch along its length.

17. An intermittent driving head for conveyors and the like comprising a pair of cylindrical cams each having a generally helical camming surface and having their axes parallel, gearing connecting the cams for synchronized rotation, and a motor for driving the cams, one cam having a substantially helical camming surface of constant effective pitch and the other cam having a camming surface with the same helical pitch as the one cam at points adjacent each end and with a pitch decreasing to zero at the mid-portion.

18. An intermittent driving head for conveyors and the like comprising a pair of cylindrical cams each having a generally helical camming surface and having their axes parallel, gearing connecting the cams for synchronized rotation, and a motor for driving the cams, means for starting and stopping the drive to the cams in cyclic repetition, one cam having a substantially helical camming surface of constant effective pitch and the other cam having a camming surface of variable pitch along its length.

References Cited in the file of this patent

Ingenious Mechanisms for Designers and Inventors, page 78, The Industrial Press, New York, N. Y., 1930. (Copy in Div. 12.)